United States Patent [19]

Wood

[11] Patent Number: 5,041,066
[45] Date of Patent: Aug. 20, 1991

[54] CYLINDRICAL ROLLER TRANSMISSION

[76] Inventor: Samuel R. Wood, 3 Raymond Ave., Warrawee NSW 2074, Australia

[21] Appl. No.: 413,830

[22] Filed: Sep. 28, 1989

[51] Int. Cl.$^5$ .............................................. F16H 13/06
[52] U.S. Cl. ................................... 475/195; 475/182; 475/183
[58] Field of Search ............... 475/183, 195, 196, 182, 475/334, 346, 347; 74/206

[56] References Cited

U.S. PATENT DOCUMENTS

| | | | |
|---|---|---|---|
| 1,709,345 | 4/1929 | Garrard | 475/183 X |
| 1,782,756 | 11/1930 | Edmunds et al. | 475/195 |
| 3,021,730 | 2/1962 | Banker | 475/196 |
| 3,954,029 | 5/1976 | Wood | 475/195 |
| 4,052,915 | 11/1977 | Kraus | 475/183 X |
| 4,215,595 | 8/1980 | Kraus | 475/195 |
| 4,422,351 | 12/1983 | Kraus | 475/195 |
| 4,440,043 | 4/1984 | Kraus | 74/206 X |
| 4,454,788 | 6/1984 | Kraus | 475/195 |
| 4,658,674 | 4/1987 | Kraus | 475/195 |

OTHER PUBLICATIONS

D. Dowson & G. R. Higginson, *Elasto-Hydrodynamic Lubrication*, pp. 49-51, and 180-181, Pergamon Press, 1977.

C. R. Evans & K. L. Johnson, "The Rheological Properties of Elastohydrodynamic Lubricants", Proceedings of Institution of Mechanical Engineers, vol. 200, #C5, pp. 303-312, (1986).

C. R. Evans & K. L. Johnson, "Regimes of Traction in Elastohydrodynamic Lubrication", Proceedings Institution of Mechanical Engineers, vol. 200, #C5, pp. 313-324, (1986).

*Primary Examiner*—Allan D. Herrmann
*Assistant Examiner*—Benjamin Levi
*Attorney, Agent, or Firm*—Edwin D. Schindler

[57] ABSTRACT

An epicyclic assembly to transmit torque and motion between externally connectable members using cylindrical elements maintained in rolling contact by surrounding rings and helical coils, the latter being in continuous helical paths. The rings and helical coils provide an effectively cylindrical inner surface of a diameter determined by the diameters of the cylindrical elements within it. Axial pressure exerted on the rings is redirected inwardly by angled surfaces of the rings to cause the helical coils to contract radially onto the cylindrical elements.

2 Claims, 5 Drawing Sheets

CYLINDRICAL ROLLER TRANSMISSION

This invention is an epicyclic rolling contact assembly which transmits torque and motion between rotatable members connectible for external drive. Developed from a related earlier form disclosed in U.S. Pat. No. 3,954,029 it has for its object the provision of more compact and economical construction, much higher torque capability, and new modes of assembly, among which may be noted single and multiple differential transmissions, usable to provide speed change by switching when driven by electric motors, as described in an accompanying specification of the inventor, accorded Ser. No. 7/413,879, filed Sept. 28, 1989, entitled "Rotary Differential Drive."

Characteristic of this transmission is its smooth operation, compactness, durability, and ability to withstand torsional shock.

Notwithstanding their potential advantages transmissions employing cylindrical rolling elements have not been widely used, chiefly because high pressure is required at the lines of contact to obtain adequate traction with lubricated components, and the prior means of exerting such pressure have been subject to limitations.

Broadly the transmission comprises a generally tubular encasement closed by a bearing plate at each end, a ring and coil sub-assembly within the encasement and surrounding the cage portion of a composite shaft and cage which carries rollers equi-spaced circumferentially parallel to a common central axis, the ring and coil sub-assembly presenting to the rollers an inner effectively cylindrical surface with which they are in rolling contact outwardly, the inner surface being contractible uniformly about the central axis. The rolling portion of a central shaft is inwardly of and in rolling contact with the rollers. The shaft portion of the composite shaft and cage and the central shaft, each have an extension for external connection passing through a bearing plate of the encasement.

The ring and coil sub-assembly is assembled on axi-parallel studs passing through the encasement, and has its inner surface formed by one or more helical coils each axially located in a contractible flexile ring having an angled external shoulder at each side in contact with a similarly angled diverging recess in a pressure ring. Adjacent pressure rings are spaced apart by the intervening flexile ring. Axial pressure applied at one or both ends to the whole ring and coil subassembly is exerted throughout its length by transfer to and from successive pressure rings and flexile rings and re-directed inwardly at each flexile ring shoulder to maintain pressure between the helical coils, rollers and central shaft. The pressure rings are of substantial section to maintain the requisite pressure on the rolling elements without themselves being subjected to excessive stress and deflection. Each helical coil is confined circumferentially between abutments projecting inwardly from the pressure rings in contact with the flexile ring in which the coil is located. Preferably the turns in each helical coil consist of a small whole number and a fraction, in order that the abutments may be distributed circumferentially. Successive coils lie generally in a continuation of the helical path of the first coil. Transmission of torque to the encasement takes place from the coils via the abutments to the pressure rings, thence to the axi-parallel studs and the bearing plates.

For a given axial pressure on the ring and coil subassembly the total pressure on each roller is proportional to the number of helical coils. The purpose of the construction described is to increase the length of the assembly by using a number of helical coils and associated flexile rings and pressure rings and thereby to provide substantial multiplication of pressure on the rolling elements to obtain maximum torque capability in a particular assembly.

Bearings transmitting driving traction at the end of each roller are unconstrained radially in the roller cage, not therefore being subjected to any part of the inward pressure on the roller.

The diameter assumed by the helical coil or coils is twice the roller diameter added to the diameter of the rolling portion of the central shaft. The contraction must be from an initial higher diameter to a minimum giving sufficient range and margin to ensure maintenance of pressure over the working life. Dimensionally, provision is required for the displacements and clearances necessary to meet the designated upper and lower limits of diameter. Contraction takes place by relative movement, under the applied pressure, of the angled surfaces of flexile and pressure rings, causing reduction of the coil diameter accompanied by reduced coil end i.e. circumferential clearance at abutments, reduced side clearance between adjacent coils and flexile rings, and reduced gap between pressure rings, the whole resulting in shortening of the ring and coil sub-assembly. There is a simple numerical relationship between the associated diametral and axial changes.

The encasement is sealed to contain fluid which serves as lubricant and tractant. Theoretical and experimental study of the behaviour of lubricated rolling elements under various conditions of operation has been the subject of extensive research over some forty years resulting in progressive elucidation in technical publications of the factors determining tractive effect and other aspects of performance.

When the transmission is used only for a fixed ratio reduction or increase in speed between the shafts the encasement is stationary and may be suitably mounted by customary means such as feet, flange, or clamps. For use as a differential transmission the encasement needs driving means e.g. pulley, sprocket, or gear and to be rotatably supported either in bearings, or by rigid coupling of the extension of the composite shaft and cage or by both shafts.

The foregoing outline will be understood more readily by reference to the following detailed description, and to the accompanying drawings of which:

Figure 1:
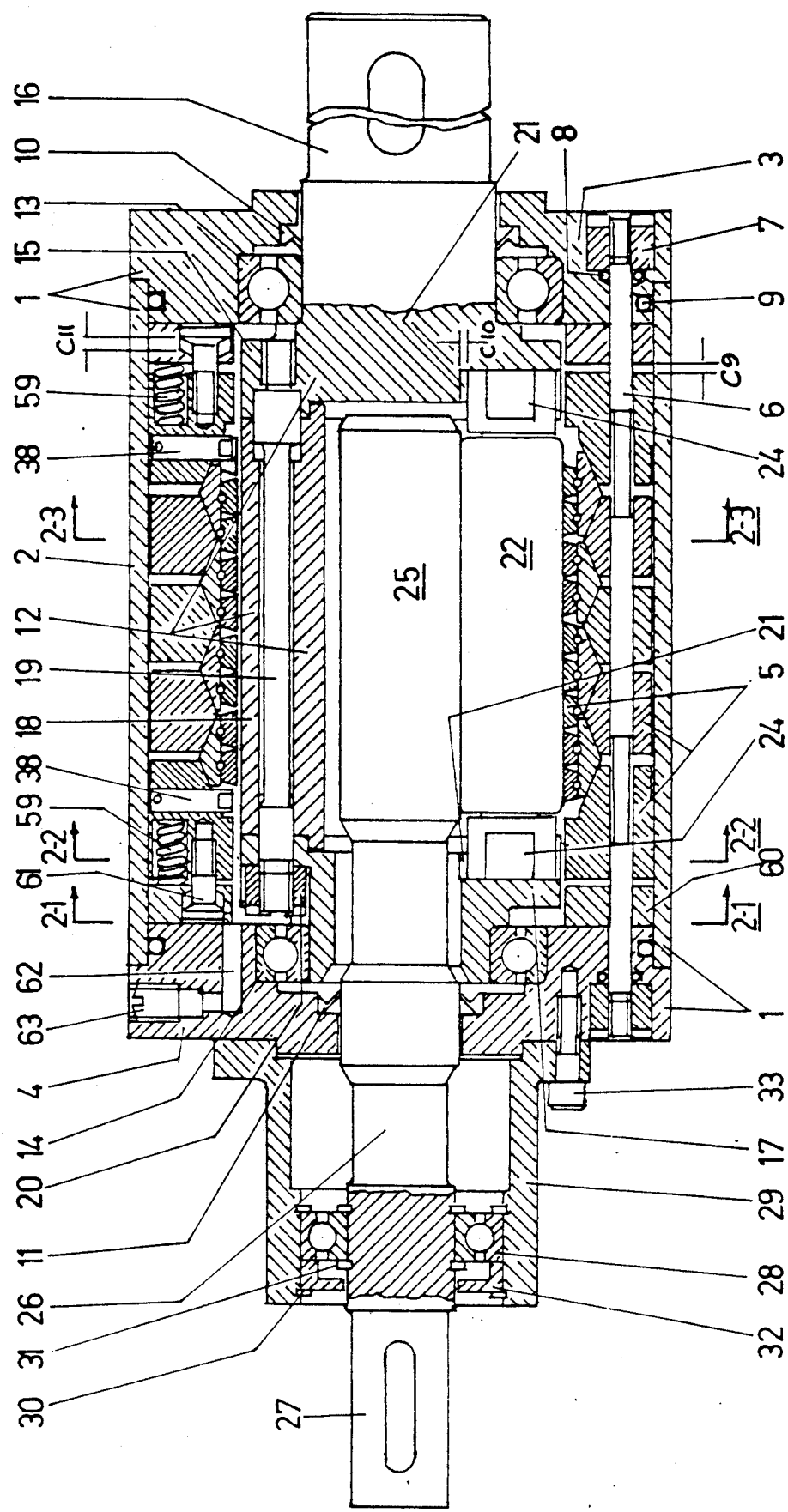
FIG. 1 is a longitudinal elevation of one basic assembly sectioned generally on line 1—1 of FIG. 2.
Figure 3:
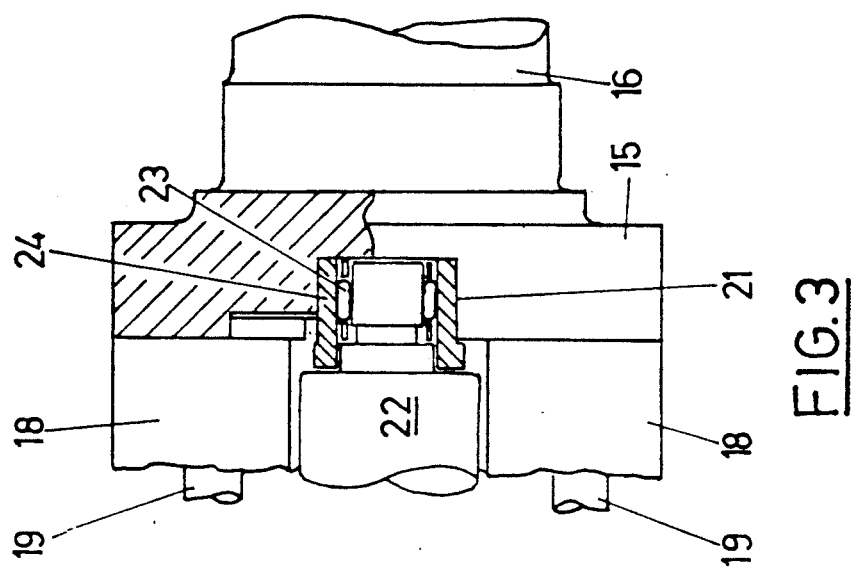
FIG. 3 is a longitudinal section through a bearing interposed between a roller and the cage carrying the roller
Figure 2:
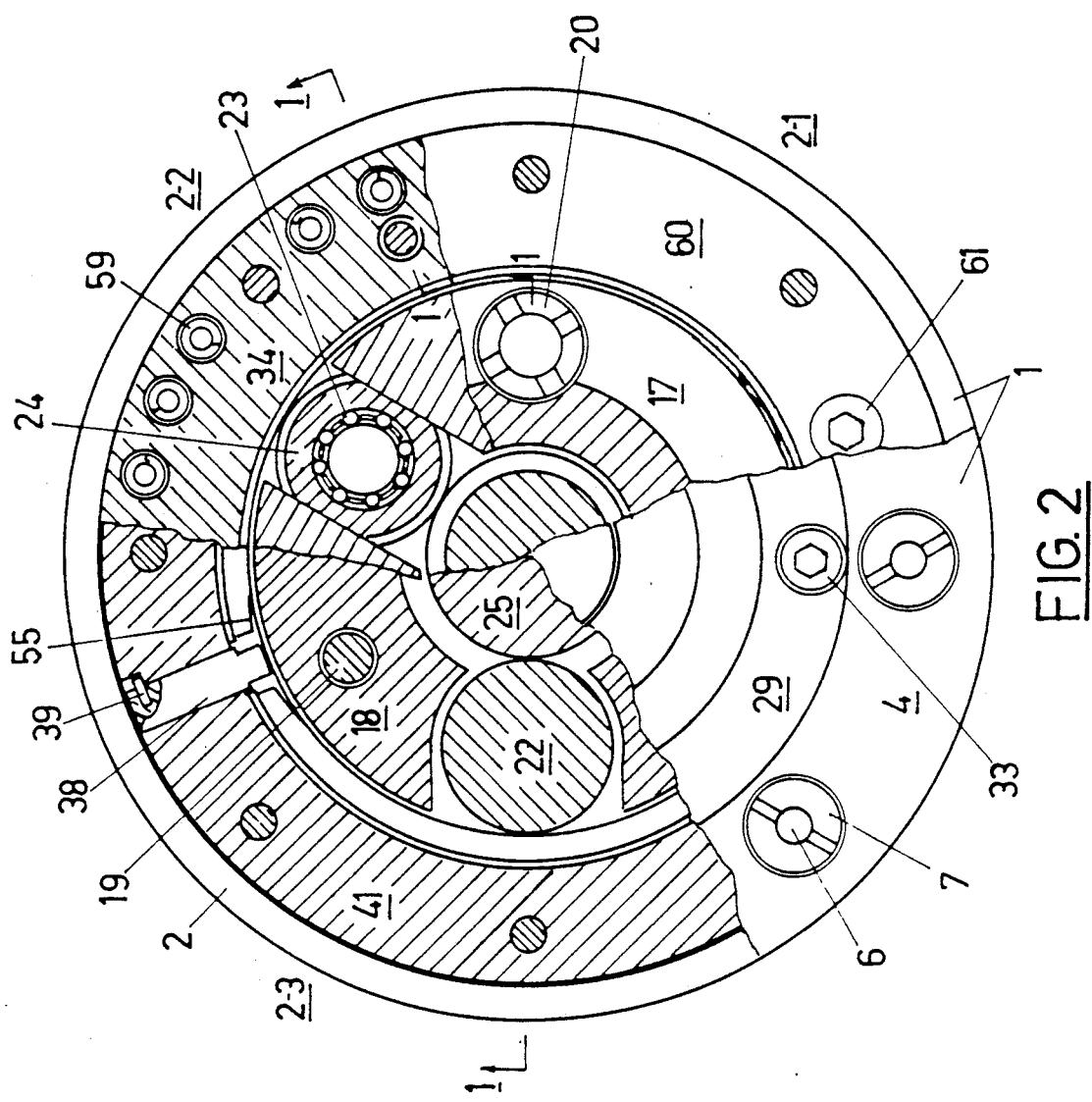
FIG. 2 is a transverse elevation with partial sections lying in planes 2-1, 2-1, 2-2, 2-2 and 2-3. 2-3 FIG. 1.

Referring to FIG. 1 and FIG. 2 an encasement identified generally by 1 comprises tube 2 and bearing plates 3 and 4. Within encasement 1 ring and coil subassembly 5 is assembled on aligning and retaining studs 6 which are parallel to the central axis and pass through and retain bearing plates 3 and 4. Nuts 7 on studs 6 secure the whole assembly as a unit. Bearing plates 3 and 4 carry 0 ring seals 8 and 9 and shaft seals 10 and 11. Ring and coil sub-assembly 5 surrounds the cage of composite shaft and cage 12 rotatable with respect to encasement 1 in bearings 13 and 14. The components of composite shaft and cage 12 are flange 15 with shaft extension 16, flange 17, spacers 18, clamping studs 19, and nuts 20. Shaft extension 16 may be integral with flange 17 as shown, or suitably secured to it. Flanges 15 and 17 have equispaced radial slots 21 each as shown in FIG. 3 to carry rollers 22, rotatable in needle bearings 23, in turn housed in sleeves 24 which are displaceable in slots 21 in order that bearings 23 are not subjected to pressure applied to rollers 22 by ring and coil sub-assembly 5. Clamping studs 19 have a closely fitting portion adjacent to each screwed end to serve as dowels between flanges 15 and 17 and spacers 18 to ensure precise alignment of slots 21 and accordingly of rollers 22. Rollers 22 are in contact with rolling portion 25 of shaft 26, which has an extension 27 for external drive, and supporting bearing 28 in cover 29, bearing 28 being retained by circlips 30 and 31 and dust cover 32. Cover 29 is attached to bearing plate 4 by screws 33.

Figure 5:
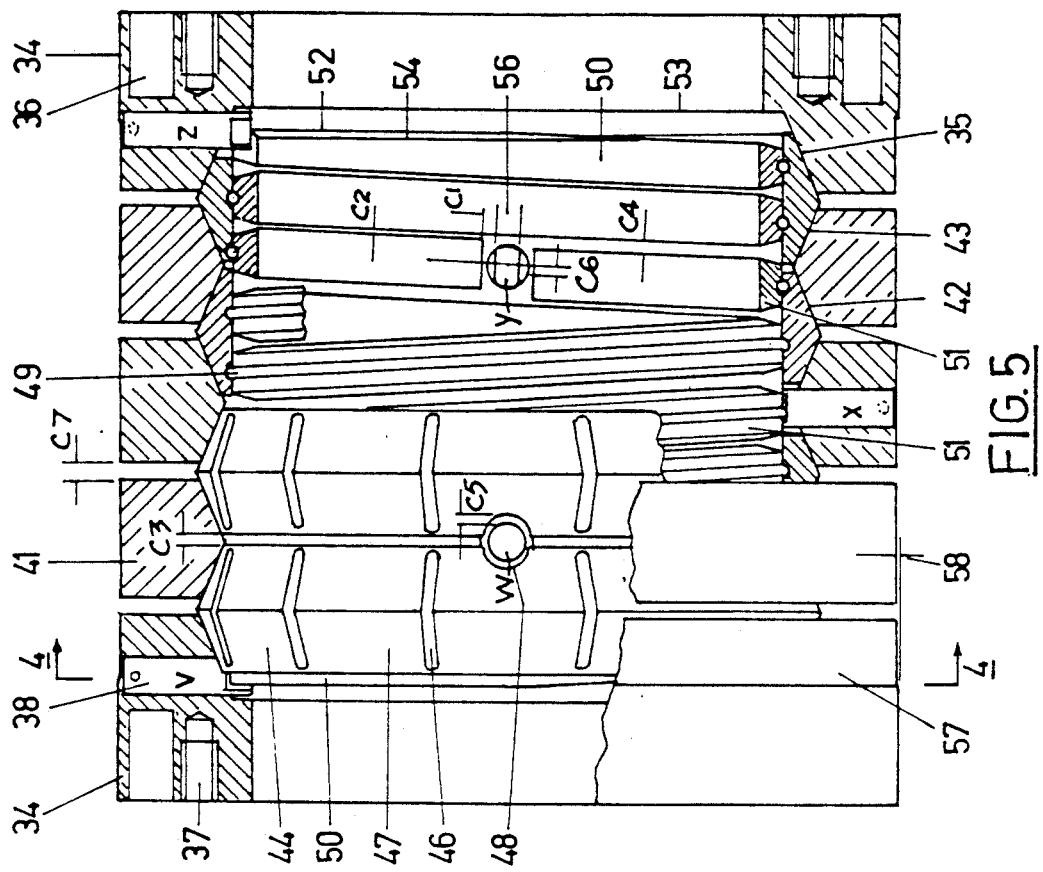
FIG. 5 is a longitudinal elevation of the ring and coil sub-assembly with partial sectioning in the direction 5—5 of FIG. 4.
Figure 4:
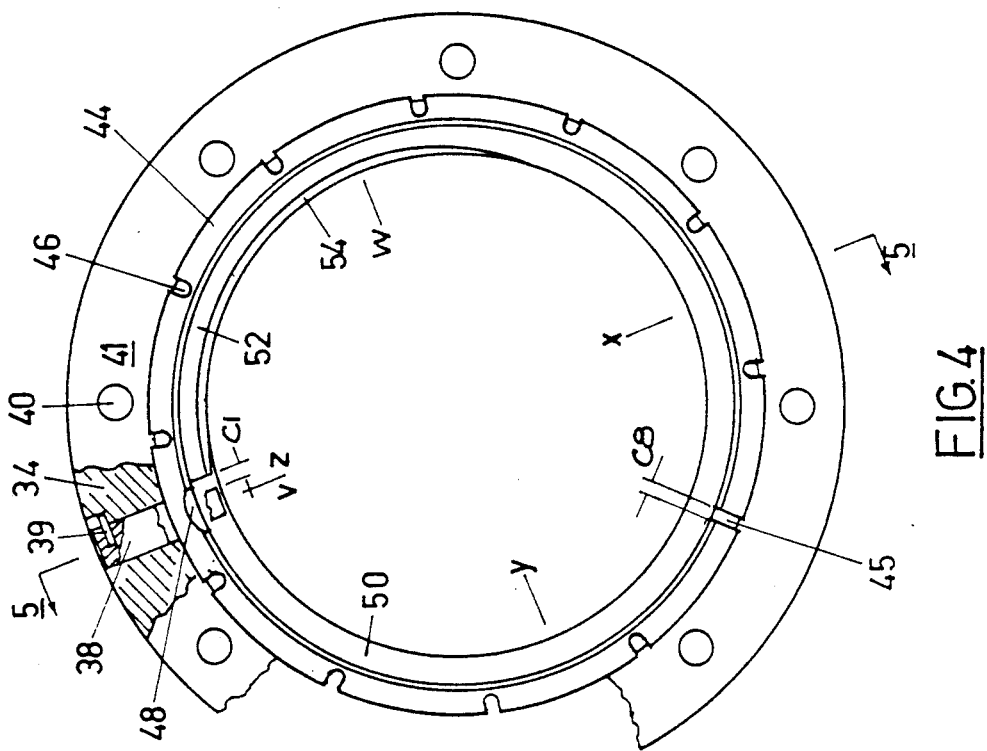
FIG. 4 is a transverse view of, the ring and coil subassembly in plane 4—4 of FIG. 5 omitting the pressure ring.

Referring to FIG. 4 and FIG. 5 and identifying individual components of ring and coil sub-assembly 5, pressure rings 34 have an angled recess 35 on one side, and are drilled as shown at 36 for springs and at 37 for screws. Abutment 38 with retaining pin 39 is preferably located mid-way between holes 40, through which pass axi-parallel studs 6. Pressure rings 41 have angled recesses 42 and 43 and an identical abutment 38 preferably in the same position relative to holes 40 as in pressure rings 34. Pressure rings 34 and 41 are spaced apart by flexile rings 44 which have an angled shoulder 47 at each side and occupy the similarly angled recesses in the respective pressure rings. Also in flexile rings 44 are cut-outs 48 through which pass abutments 38. Flexile rings 44 have circumferential gaps 45 to permit contraction and where desirable are partially severed at intervals as shown at 46 to increase pliancy.

Axially located in each flexile ring 44 by helical retainer 49 is a helical coil 50 or 51. Helical coil 50 is used in conjunction with pressure ring 34 and is trimmed back along one side from its extremity within recess 35 so that side face 52 is parallel to shoulder 53 at the bottom of recess 35. The inner diameter of helical coil 50 adjoining side face 52 is chamfered as shown at 54 so that no part of helical coil 50 unsupported by flexile ring 44 is subjected to the pressure of rollers 22. Helical coil 51 is used in conjunction with pressure ring(s) 41 and is terminated without reduction in width at either extremity. Helical coils 50 and 51 have a relief 55 at their inner diameter (FIG. 2) extending ten degrees to fifteen degrees from each extremity measured from the central axis. Retainers 49 terminate flush with the extremities of each helical coil 50 or 51. The width of flexile ring 44 is the coil pitch multiplied by number of turns in coil, with a small downward tolerance.

In FIG. 1 and FIG. 5 the shoulder angle of flexile ring 44 and pressure rings 34 and 41 is 22.5 degrees. A smaller angle is less able to accommodate slight errors of concentricity, form, and alignment in the assembly, may cause excessive pressure if these errors are present, and increases axial displacement for a given contraction. If the angle is too large, axial pressure becomes excessive.

In the example illustrated in FIG. 4 and FIG. 5 there are two helical coils 50 and two 51 with five abutments 38. Helical coils 50 and 51 have two and one quarter turns, measured to the abutment centres, the actual being a little less to provide for circumferential clearance, and abutment width 56. It is preferred that the number of turns in each helical coil be uniform, in order that the distribution of abutments 38 is also uniform, enabling pressure rings 34, pressure rings 41 and flexile rings 44 respectively to be interchangeable in the assembly, such interchangeability also requiring uniform spacing of axi-parallel studs 6, and suitable relationship between the spacing and the fractional part of the number of turns in helical coils 50 and 51. It is to be noted that cut-outs 48 in flexile rings 44 are spaced to correspond to the number of turns, are in opposite side faces, and equi-spaced from the remote end of the diameter passing through gap 45. In order to clarify the distribution, abutments 38 are identified individually by letters v, w, x, y, z in FIG. 4 and FIG. 5 showing the position of each.

It will be evident that while the particular ring and coil sub assembly 5 shown in FIG. 1, FIG. 4, and FIG. 5 has four helical coils, any desired number from one to a maximum governed by driving capacity and suitable proportioning of the assembly may be used. If there is only a single coil, two opposed pressure rings 34 would be required, one on each side of a single flexile ring 44, assembled with abutments in positions v and w only, the single coil then differing from helical coils 50 and 51 in having both terminations as shown at 52 and 54. Each additional coil 50 or 51 requires an additional flexile ring 44 and pressure ring 41, and a correponding change in the length of conforming axially disposed components in FIG.1 viz encasement tube 2, axi-parallel studs 6, rollers 22, spacers 18, clamping studs 19, and rolling portion 25 of shaft 26.

To accommodate any difference in deflection between pressure ring 34 and pressure ring 41, portion 57 of the outer diameter of pressure ring 34, and the outer diameter of pressure ring 41, have a small clearance 58 in encasement tube 2. For the same reason axi-parallel studs 6 are reduced as shown in FIG. 1 between pressure rings 34 and 41.

It is important for axi-parallel studs 6 to be on or close to the neutral axis in bending of pressure ring(s) 41, the position of the neutral axis being determined for the cross section of pressure ring(s) 41 at the stud.

Referring again to FIG. 1 pressure rings 34 carry springs 59, which exert axial pressure on the ring and coil sub-assembly 5. Springs 59 are retained in pressure ring 34 by pre-compression plate 60, and screws 61. Screws 61 are assembled to a pre- set depth and recessed in precompression plate 60 a little in excess of the axial displacement of pressure ring 34 required to give the predetermined contraction of helical coils 50 and 51. When assembled in encasement 1 with all components in position and nuts 7 on axi-parallel studs 6 tightened uniformly, springs 59 are further compressed, and precompression plate 60 takes a position leaving a small clearance to pressure ring 34, and clearance for the axial displacement of pressure ring 34 below the heads of screws 61. In small diameters of transmission or short assemblies it suffices to fit springs 59 at one end only of ring and coil sub assembly 5, using spacers on studs 6 if necessary for length correction.

Oil filling ducts, preferably TW., diametrically opposed, are provided as indicated 62, and fitted with closure plugs 63.

For a nominal diameter which is the predetermined upper limit of the inner diameter of helical coils 50 and 51, to which twice the diameter of rollers 22 added to the diameter of rolling portion 25 of shaft 26 must correspond to make use of the full contraction range, there is advantage in s small initial pre-contraction of helical coils 50 and 51 obtained by sizing them 0.2 to 0.25 percent above nominal. A suitable diametral contraction below nominal to ensure maintenance of pressure is 0.6 to 1.0 per cent, provided as explained above by the functioning of the ring and coil subassembly in response to the applied pressure. The points at which displacement or clearance is necessary for the contraction are marked by letter prefix C in FIG. 1, FIG. 4, and FIG. 5 and are as follows:

C1 circumferential clearance between ends of helical coils 50 and 51 and abutments 38
C2 side clearance between coil turns
C3 side clearance between flexile rings 44 at nominal diameter
C4 side clearance between adjacent coils at nominal diameter (C2+C3)
C5 clearance to abutments 38 in flexile ring cut-outs 48
C6 offset at nominal diameter between successive coil ends.
C7 clearance between adjacent pressure rings (two to three times C3)
C8 clearance at nominal diameter in flexile ring gap 45
C9 clearance at nominal diameter for pre-compression plate 60
C10 clearance at bottom of slots 21 for bearing sleeve 24
C11 axial displacement of pressure ring 34 for full contraction It is preferred to arrange for clearances C3 and C6 to become zero at the minimum diameter of helical coils 50 and 51.

Figure 6:
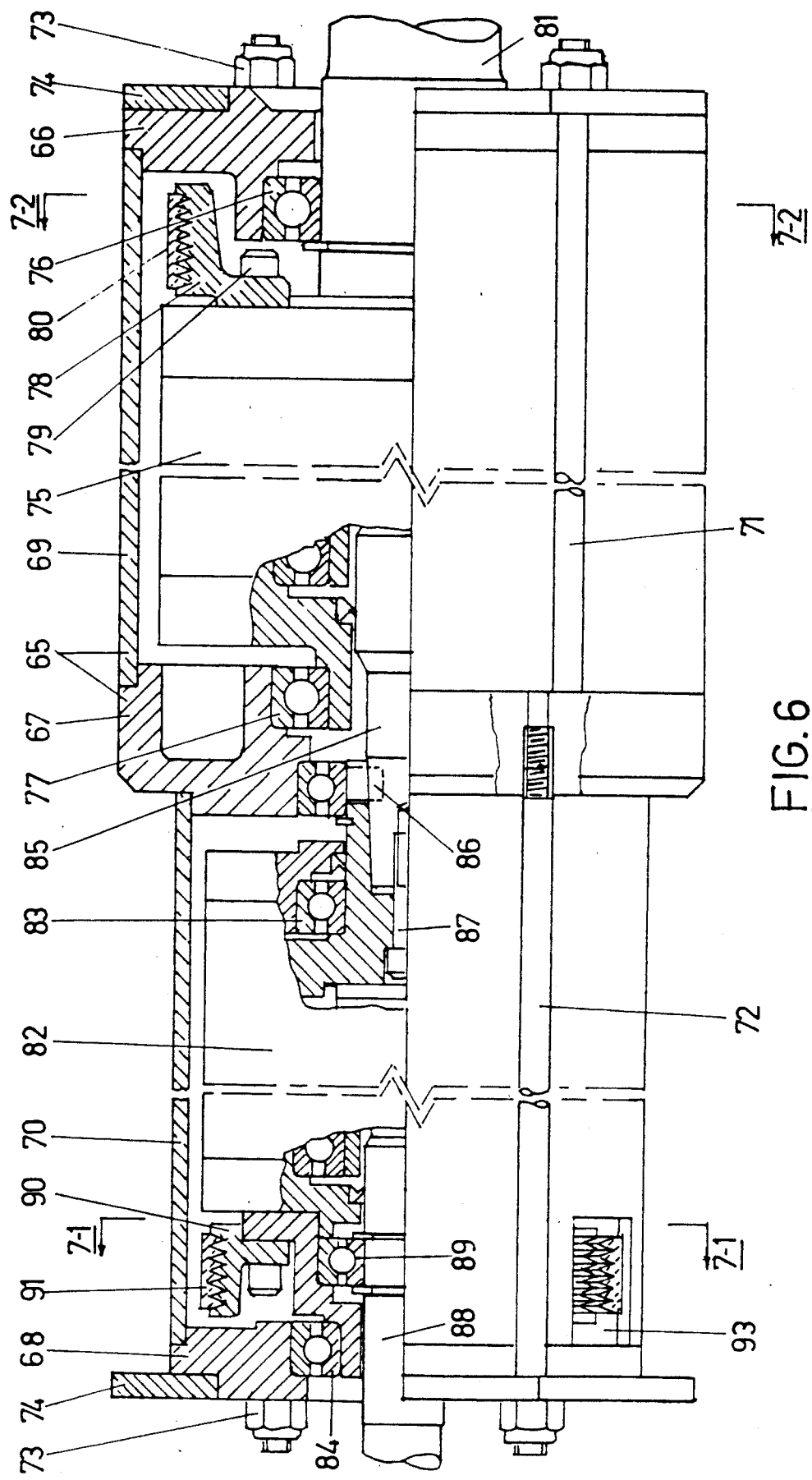
FIG. 6 is a longitudinal view in partial section of two assemblies arranged as a compound differential transmission.
Figure 7:
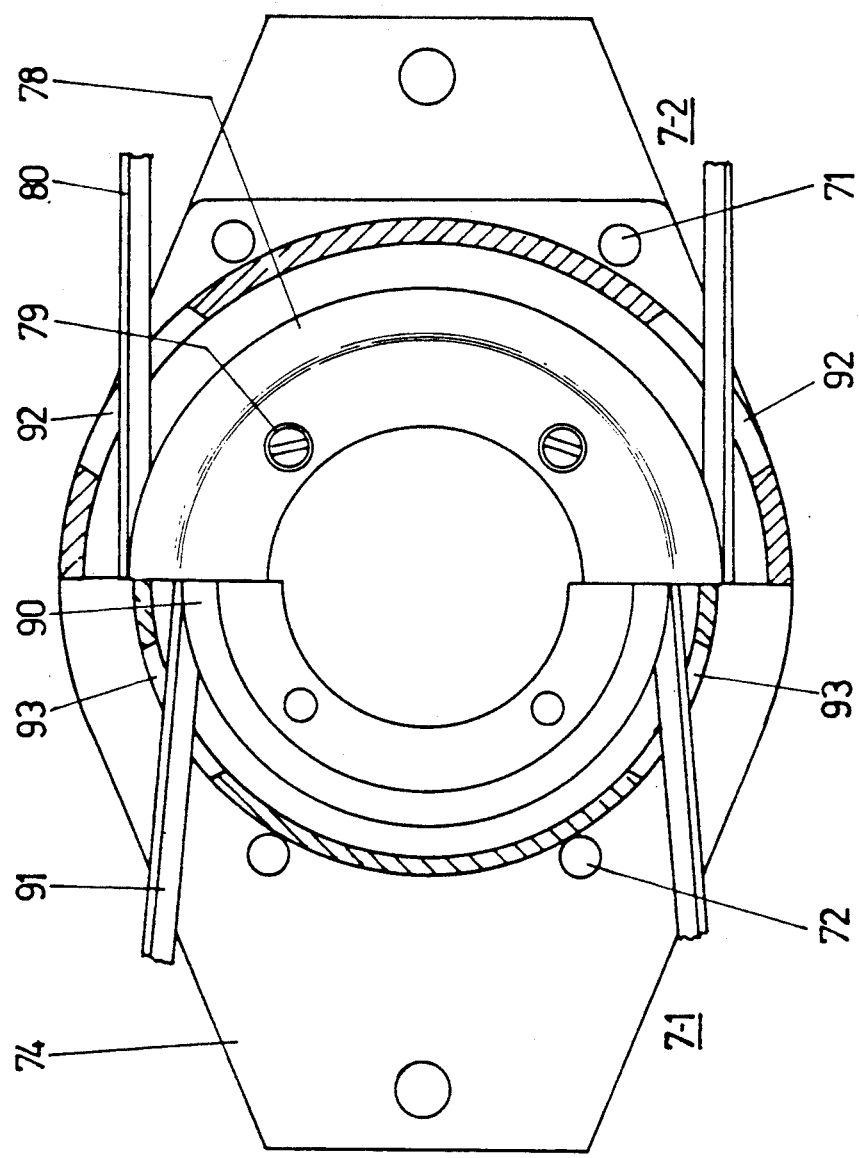
FIG. 7 is a transverse view showing drives to the differential encasements in planes, 7-1, 7-1 and 7-2, 7-2 of FIG. 6.

In FIG. 6 an arrangement whereby one or more assemblies of the form described above may be operated as a differential transmission is illustrated. A housing indicated generally by 65 comprising bearing plates 66, 67, and 68 spaced and aligned by tubes 69 and 70 is clamped to form a unit by studs 71 and 72 and nuts 73, the whole being provided with mounting plates 74 for external support. Transmission assembly 75 is supported in bearings 76 and 77 and has pulley 78 secured to its encasement by screws 79, being driven by multi-ribbed belt 80 or a suitable alternative such as cogged belt, chain, or gear. Bearing 76 is mounted on extension 81 of the composite shaft and cage of assembly 75. A second transmission assembly 82 is supported in bearings 83 and 84 and has a separate extension 85 of its composite shaft and cage passing into the encasement of assembly 75. Extension 85 is secured to the flange of the composite shaft and cage of assembly 82 by key 86 and screw 87. Extension 85 intercouples assemblies 82 and 75 and constitutes the central shaft of the latter. Central shaft 88 of assembly 82 is supported in bearing 89. Pulley 90 and belt 91 drive the encasement of assembly 82. Tubes 69 and 70 have slots 92 and 93 through which belts 80 and 91 pass, as shown in FIG. 7. The belts may be placed at virtually any angle by suitable setting of tubes 69 and 70.

If the single assembly 75 only is used as a differential transmission bearing plate 67 is dispensed with and replaced by an arrangement of shaft and bearings generally as shown in association with bearing plate 68. The difference in size of assemblies 75 and 82 shown in FIG. 6 is indicative of the difference in torque capability at shafts 81 and 85.

I claim:

1. A cylindrical roller transmission comprising an encasement having a cylindrical bore with end faces normal to the axis of the bore, a bearing plate at each end face carrying bearing means centered on the axis, a plurality of retaining studs parallel to the axis and in end engagement with the bearing plates, a ring assembly on portions of said studs within the encasement bore, said ring assembly being comprised of a number exceeding two proximate pressure rings with a separation gap between adjacent pressure rings, each separation gap being effected by a flexible ring severed at its circumference to render said flexible ring contractible, each said flexile ring having oppositely disposed angled circumferential shoulders occupying and contiguous with complementarily angled recesses in adjacent pressure rings, a helical coil located axially within each flexile ring, an inwardly protruding abutment carried in each pressure ring for contact by an end of the helical coil in the flexile ring with which the pressure ring in contiguous or by an end of each of two helical coils where the pressure ring is contiguous with two flexile rings, a cage and shaft composite centered on said axis of the bore carrying a cluster of rotatable rollers parallel to said axis and end mounted in bearings which are unconstrained radially, said rollers being equispaced and in contact with an inner surface of the helical coils and said shaft extending from the encasement, a further shaft centered on the axis of the bore having a rolling portion lying within said cluster and in rolling contact with the rollers with a portion of said further shaft extending from the encasement, whereby pressure applied axially to the ring assembly by spring means is exerted radially at lines of contact between the helical coils and said rollers, and between the rollers and the rolling portion of said further shaft.

2. A cylindrical roller transmission comprising an encasement having a cylindrical bore with end faces normal to the axis of the bore, a bearing plate at each end face carrying bearing means centered on the axis of the bore, a plurality of retaining studs parallel to the axis and in end engagement with the bearing plates, a ring assembly on portions of said studs within the encasement bore, said ring assembly being comprised of two proximate pressure rings with a separation therebetween effected by a flexile ring severed at its circumference to render said flexile ring contractible, the flexile ring having oppositely disposed angled circumferential shoulders each occupying and contiguous with complementarily angled recesses in the pressure rings, a helical coil located axially within the flexile ring, an inwardly protruding abutment carried in each pressure ring for contact by an end of the helical coil, a cage and shaft composite centered on the axis of the bore carrying a cluster of rotatable rollers parallel to said axis and end mounted in bearings which are unconstrained radially, said rollers being equispaced and in contact with an inner surface of the helical coil and said shaft extending from the encasement, a further shaft centered on the axis of the bore having a rolling portion lying within said cluster and in rolling contact with the rollers with a segment of said further shaft extending from the encasement, wherein pressure applied axially to the ring assembly by spring means is exerted radially at lines of contact between the helical coil and said rollers, and between the rollers and the rolling portion of said further shaft.

* * * * *